(12) United States Patent
Gibson et al.

(10) Patent No.: US 10,005,462 B2
(45) Date of Patent: Jun. 26, 2018

(54) SYSTEM AND METHOD FOR OPERATING A TRANSMISSION DURING AN ENGINE STOP AND START FOR A ROLLING VEHICLE

(71) Applicant: Ford Global Technologies, LLC, Dearborn, MI (US)

(72) Inventors: Alexander O'Connor Gibson, Ann Arbor, MI (US); Steven Anatole Frait, Milan, MI (US); Matthew John Shelton, Grosse Ile, MI (US); Hong Jiang, Birmingham, MI (US); Kirk Pebley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 14/929,997

(22) Filed: Nov. 2, 2015

(65) Prior Publication Data

US 2017/0120917 A1    May 4, 2017

(51) Int. Cl.
| | |
|---|---|
| *B60W 30/18* | (2012.01) |
| *F16H 61/02* | (2006.01) |
| *B60W 10/11* | (2012.01) |
| *B60W 10/06* | (2006.01) |
| *F16H 61/00* | (2006.01) |
| *F16H 63/06* | (2006.01) |

(52) U.S. Cl.
CPC ...... *B60W 30/18072* (2013.01); *B60W 10/06* (2013.01); *B60W 10/11* (2013.01); *F16H 61/0031* (2013.01); *F16H 61/0265* (2013.01); *F16H 63/065* (2013.01); *B60W 2510/0638* (2013.01); *B60W 2540/10* (2013.01); *F16H 63/067* (2013.01); *F16H 2306/36* (2013.01)

(58) Field of Classification Search
CPC ........... B60W 30/18072; B60W 10/11; B60W 10/06; B60W 2540/10; B60W 2510/0638; F16H 63/067; F16H 61/0031; F16H 61/0265
See application file for complete search history.

(56) References Cited

U.S. PATENT DOCUMENTS

| | | | |
|---|---|---|---|
| 2009/0111642 A1 | 4/2009 | Sah et al. | |
| 2009/0118954 A1* | 5/2009 | Wu | B60W 50/04 701/60 |
| 2012/0209480 A1* | 8/2012 | Hamane | B60W 10/06 701/54 |
| 2014/0129083 A1* | 5/2014 | O'Connor Gibson | B60G 99/00 701/37 |
| 2015/0119192 A1 | 4/2015 | Otanez | |
| 2015/0316143 A1* | 11/2015 | Deurloo | F16H 63/3483 192/219.4 |
| 2017/0120916 A1* | 5/2017 | Gibson | B60W 30/18072 |

* cited by examiner

*Primary Examiner* — Sherry L Estremsky
*Assistant Examiner* — Lillian T Nguyen
(74) *Attorney, Agent, or Firm* — Julia Voutyras; McCoy Russell LLP (57) ABSTRACT

Methods and systems for improving operation of a vehicle driveline that includes an engine and an automatic transmission with a torque converter are presented. In one non-limiting example, the engine may be stopped while a vehicle in which the engine operates is rolling. A transmission coupled to the engine may be shifted as the vehicle rolls so that vehicle response may be improved if a driver requests an increase of engine torque.

20 Claims, 7 Drawing Sheets

SYSTEM AND METHOD FOR OPERATING A TRANSMISSION DURING AN ENGINE STOP AND START FOR A ROLLING VEHICLE

BACKGROUND/SUMMARY

An internal combustion engine of a vehicle may be stopped and started during a vehicle drive cycle to conserve fuel. The engine may be stopped while a requested driver demand torque is low so that the vehicle may coast or so that the driver demand torque may be met via a motor. The stopped engine may be restarted if driver demand torque increases or if a battery is to be charged. However, for vehicles that are not propelled via an electric motor and that include an automatic transmission, it may be difficult to stop the engine in response to low driver demand torques because stopping the engine stops operation of a mechanically driven pump in the transmission that supplies pressurized fluid to activate transmission gears. In some transmissions, an electrically driven pump may supply transmission fluid within the transmission if the mechanically driven pump is stopped, but electrically driven pumps are often flow limited based on transmission packaging. Consequently, electrically driven pumps lack capacity to shift through a plurality of transmission gears in a short time period. Consequently, an expected level of transmission performance may not be maintainable when the engine is stopped even if the transmission includes an electrically driven pump. Therefore, it may be desirable to provide a way to stop an engine and maintain transmission operation during low driver demand conditions so that engine fuel consumption may be reduced during low driver demand torque conditions and while the vehicle is stopped.

The inventors herein have recognized the above-mentioned issues and have developed a method for operating a vehicle driveline, comprising: activating an electrically driven transmission pump in response to a request to stop an engine; and adjusting a position of a hydraulically operated screw driven clutch gap filling device via fluid provided via the electrically driven transmission pump.

By adjusting a gap filling device of a transmission clutch, it may be possible to provide the technical result of reducing flow of transmission fluid to operate transmission clutches when an engine coupled to the transmission is stopped rotating. Specifically, a small amount of transmission fluid may be supplied to a device that alters a transmission clutch filling volume so that the transmission clutch closes to engage a transmission gear using a smaller amount of transmission fluid. Consequently, the transmission clutch may be operated with transmission fluid flow from an electrically driven pump having less transmission fluid flow capacity than an engine driven transmission fluid pump. Further, in some examples, a plurality of gap filling devices may be adjusted so that a transmission gear may be applied or engaged via a plurality of clutches with reduced gap volumes. In this way, it may be possible to operate the transmission with an electrically driven pump that has a lower fluid flow capacity.

The present description may provide several advantages. In particular, the approach may reduce vehicle fuel consumption and improve response to a driver requesting driveline torque when an engine in the driveline is stopped rotating. Further, the approach may provide for partially engaging a plurality of gear clutches when an engine coupled to a transmission is stopped so that the transmission may be engaged in an appropriate gear for applying engine torque to vehicle wheels even as vehicle speed changes while the engine is stopped. Additionally, the approach may provide desired shifting even when the transmission electric pump lacks flow capacity to close a transmission clutch in a desired amount of time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
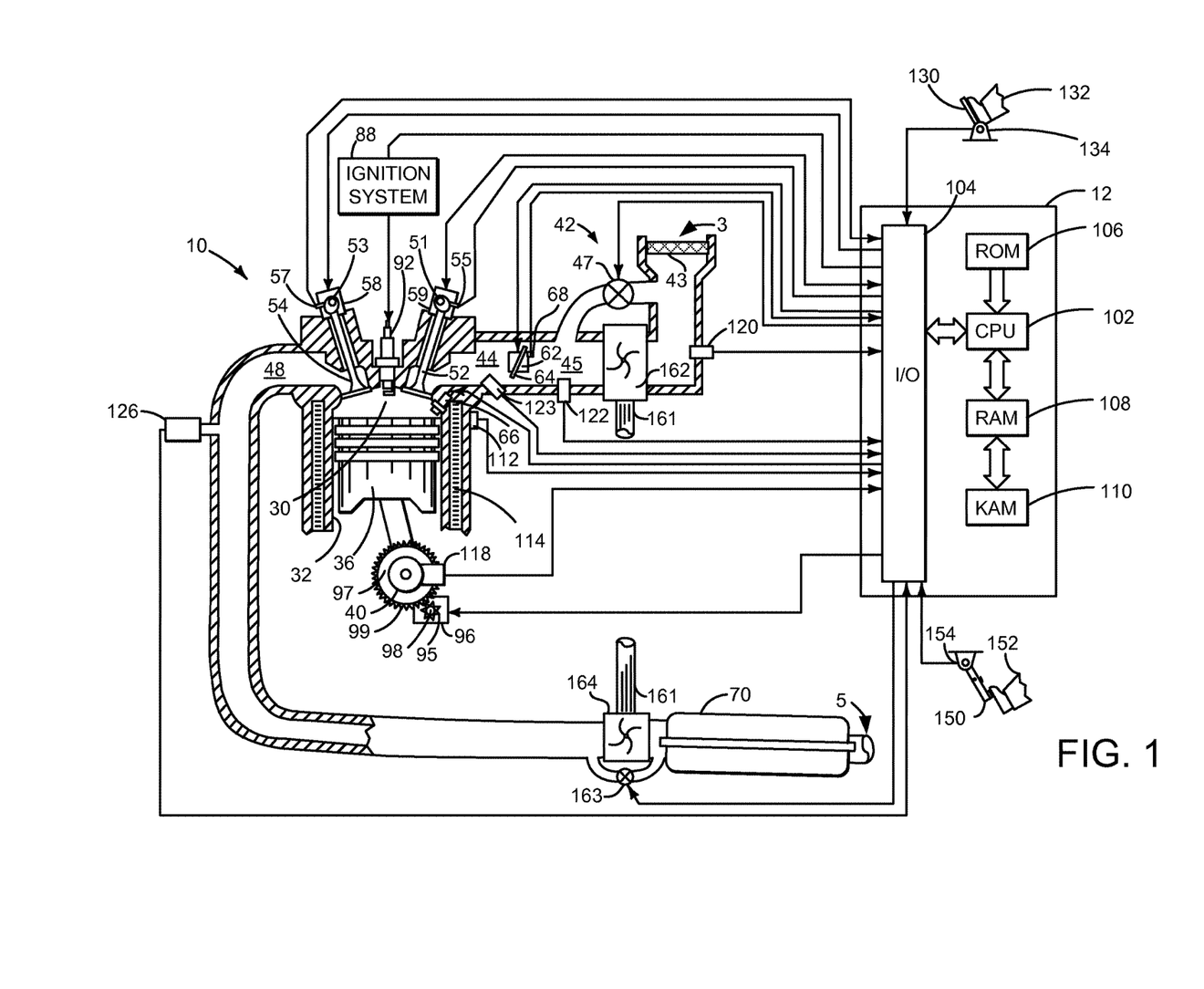
FIG. 1 shows a schematic depiction of an engine.
Figure 2:
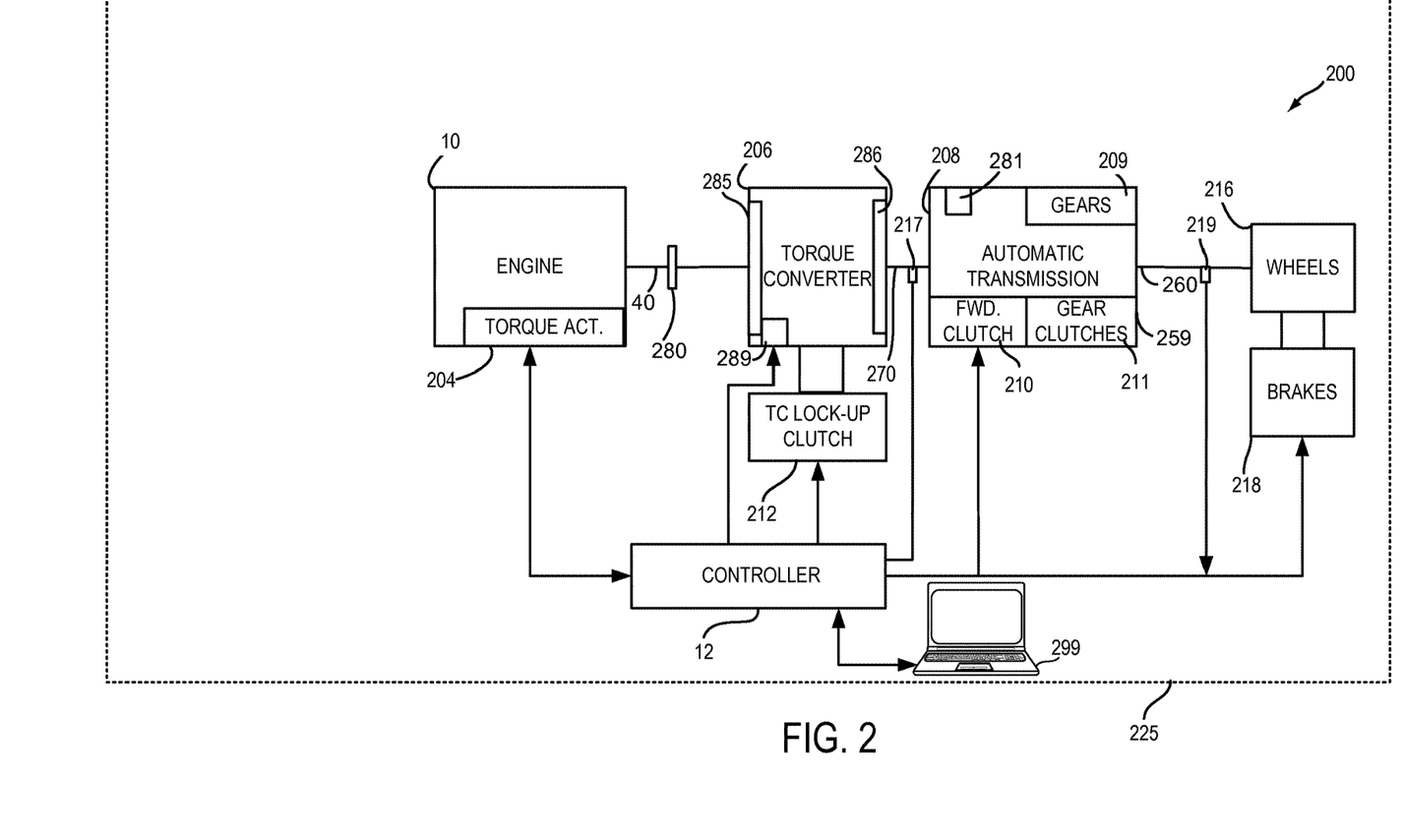
FIG. 2 shows a schematic depiction of an example vehicle driveline including an engine.
Figure 3:
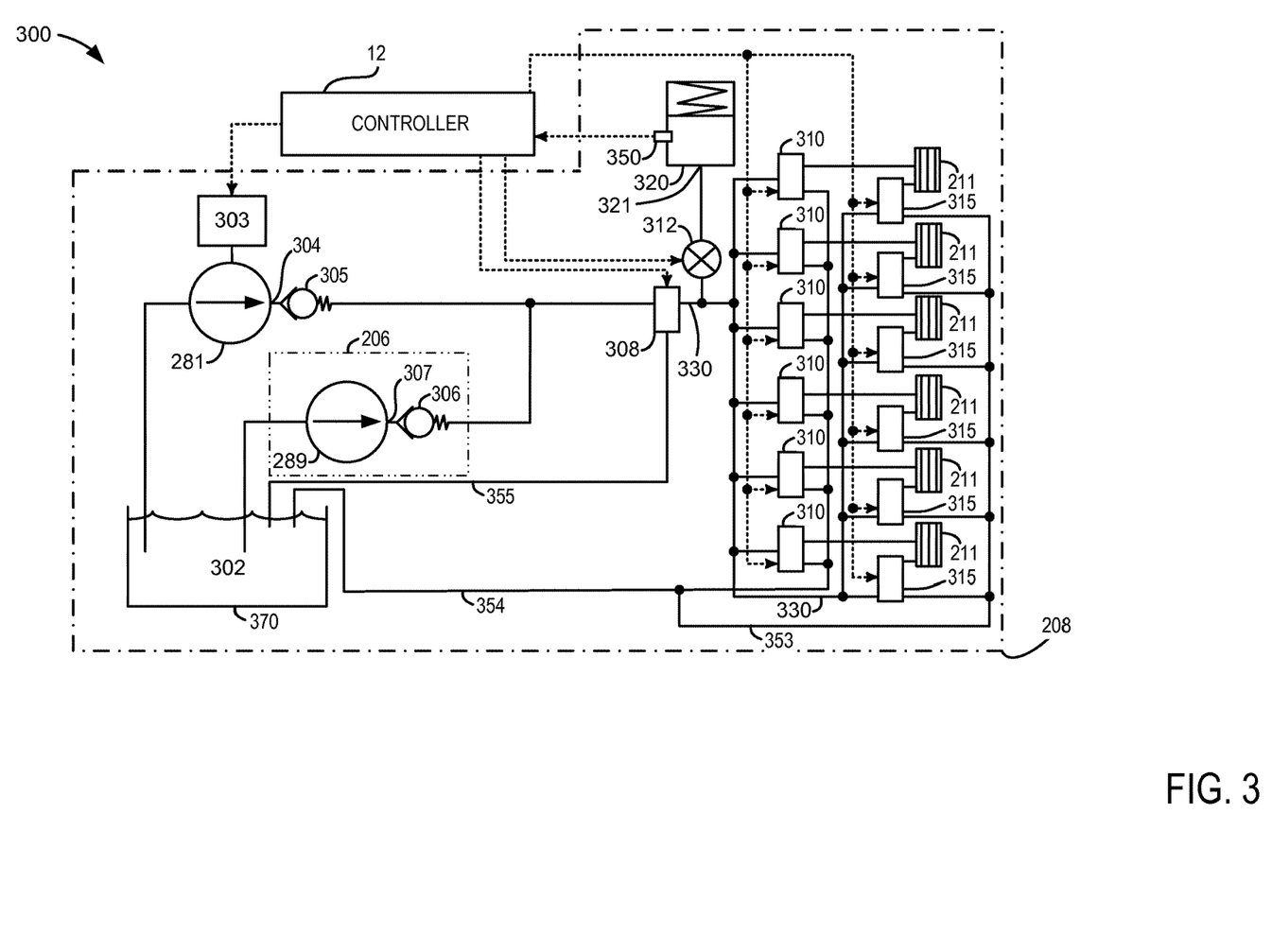
FIG. 3 shows an example schematic for supplying transmission fluid to transmission clutches.
Figure 4A:
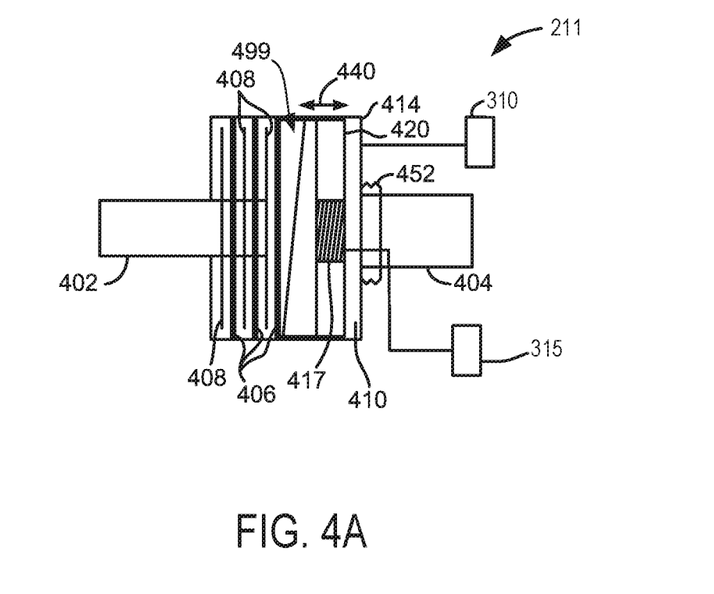
FIGS. 4A and 4B show an example clutch including a gap filling device.
Figure 4B:
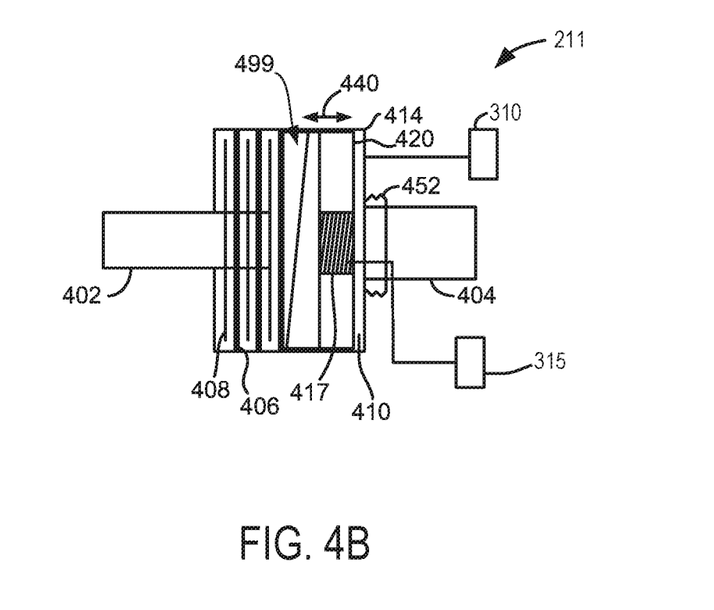

The present description is related to operating a vehicle driveline that includes an engine that is directly coupled to a torque converter. The torque converter is directly coupled to an automatic transmission. The engine may be configured as is shown in FIG. 1. The engine of FIG. 1 may be incorporated into a vehicle driveline as shown in FIG. 2, and the engine may be the only adjustable torque source in the driveline as is shown in FIG. 2. The transmission includes clutches and transmission fluid may be directed to the transmission clutches via a system as shown in FIG. 3. Transmission clutches may include gap filling devices as shown in FIGS. 4A and 4B. Pressurized transmission fluid may be supplied to one or more transmission clutches as is shown in the sequence shown in FIG. 5. The driveline may operate as shown in FIG. 6 according to the method shown in FIG. 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a driveline 200. The driveline of FIG. 2 includes engine 10 shown in FIG. 1. Engine 10 includes one or more torque actuators 204 (e.g., a throttle, camshaft, fuel injector, etc.) Driveline 200 may be powered by engine 10. Engine crankshaft 40 is shown coupled to dampener 280, and dampener 280 is shown coupled to impeller 285 of torque converter 206. Torque converter impeller 285 is mechanically coupled to transmission pump 289. Transmission mechanically driven pump 289 supplies pressurized transmission fluid to transmission clutches 210 and 211. Torque converter 206 also includes a turbine 286 coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 also includes an electrically driven pump 281 for supplying pressurized transmission fluid to gear clutches 211 when engine 10 is not rotating. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. For example, transmission 208 may be engaged in second gear when only first, third, and fourth clutches are engaged. Transmission may be in neutral when only first and third clutches are engaged. Torque output from the automatic transmission 208 may in turn be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Thus, in this example, engine 10 is the only adjustable torque source that may provide torque to driveline 200. Torque flows from engine 10 to transmission 208 before being applied to wheels 216. Thus, engine 10 is upstream of torque converter 206, transmission 208, and wheels 216 in a direction of torque flow. Further, the system includes only three speed sensors including one at the engine crankshaft, one at the transmission input shaft, and one at the transmission output shaft.

Controller 12 may be configured to receive inputs from engine 10, as shown in more detail in FIG. 1, and accordingly control a torque output of the engine and/or operation of the torque converter, transmission, clutches, and/or brakes. Further, controller 12 may receive driver input from man/machine interface 299. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When rolling-stop conditions are satisfied, controller 12 may initiate engine shutdown to stop engine rotation by shutting off fuel and/or spark to the engine. When engine restart conditions are satisfied, and/or a vehicle operator wants to increase torque to vehicle wheels, controller 12 may reactivate engine 10 by cranking engine 10 and resuming cylinder combustion.

Referring now to FIG. 3, an example schematic for supplying transmission fluid to transmission clutches is shown. Transmission system 300 includes controller 12 and transmission 208. In this example, torque converter 206 is shown as part of automatic transmission 208, but in some examples it may also be considered as being separate from automatic transmission 208. Electrical connections are shown via dashed lines while devices and hydraulic connections or conduits are shown via solid lines.

Automatic transmission 208 includes a sump 370 that holds transmission fluid 302. Electrically driven pump 281 and/or mechanically driven pump 289 may supply transmission fluid 302 to transmission gear clutches 211. Electrically driven pump 281 is rotated via electric motor 303. Transmission fluid 302 may flow out of output 304 of electrically driven pump 281 in the direction of the arrow on electrically driven pump 281. Transmission fluid may flow from electrically driven pump 281 to line pressure solenoid valve 308 by flowing through check valve 305. Check valve 305 prevents transmission fluid from flowing into electrically driven pump 281. Line pressure solenoid valve 308 controls transmission fluid pressure in passage or conduit 330. Excess transmission fluid flow may be directed from line pressure solenoid valve 308 back to sump 370 via passage or conduit 355. Transmission fluid 302 may flow out of output 307 of mechanically driven pump 289 in the direction of the arrow on mechanically driven pump 289. Transmission fluid may flow from mechanically driven pump 281 to line pressure solenoid valve 308 by flowing through check valve 306. However, check valve 306 prevents transmission fluid from flowing into mechanically driven pump 289.

In this non-limiting example, transmission 208 includes six clutch pressure control valves 310 that may direct transmission fluid 302 to six gear clutches 211. The six pressure control valves 310 may be operated individually, and more than one pressure control valve 310 may be operated at a same time. For example, a sole gear of transmission 208 may be engaged to couple an input shaft of automatic transmission 208 to an output shaft of automatic transmission 208 via closing a plurality of gear clutches (e.g., clutches 1, 2, and 4). In this example, a first gear clutch is the clutch closest to the top of FIG. 3. The second gear clutch is the second clutch closest to the top of FIG. 3, and so on. If one of the plurality of gear clutches (e.g., 1, 2, and 4) is not engaged, automatic transmission 208 is in neutral and the particular gear is partially engaged. Thus, a gear of automatic transmission 208 may be partially engaged by fully closing a plurality of gear clutches absent fully closing one clutch of a total actual number of clutches needed to fully engage the selected transmission gear. Clutch pressure control valves 310 adjust pressure of transmission fluid 302 in gear clutches 211 so as to increase or decrease a torque transfer capacity of each individual gear clutch 211. Transmission fluid 302 may be returned to sump 370 via passage 354 when pressure in one or more of clutches 211 is reduced to disengage a transmission gear.

Transmission fluid 302 may also be delivered to gap filling devices in each of clutches 211 shown in detail in FIGS. 4A and 4B via gap filler control solenoids 315. Transmission fluid rotates a screw, or alternatively displaces a piston, to activate the gap filling device (not shown). Transmission fluid may be returned from the gap filling devices to sump 370 via conduit or passage 353.

Automatic transmission 208 also includes an accumulator 320 and an accumulator flow control valve 312 positioned on an outlet side 321 of accumulator 320 to control flow of transmission fluid 302 into and out of accumulator 320. Pressure within accumulator 320 is sensed via pressure sensor 350. When mechanically driven pump 289 is rotating, pressurized transmission fluid may be stored in accumulator 320. Similarly, when electrically driven pump 281 is rotating and flow to clutches 211 is low, pressurized transmission fluid may be stored in accumulator 320. However, if mechanically driven pump 289 is not rotating and electrically driven pump is active, valve 312 may be opened to assist electrically driven pump when flow to transmission clutches 211 is at a higher level where a desired pressure downstream of line pressure solenoid 308 cannot be maintained by electrically driven pump 281. Such a condition may be present during filling of one or more gear clutches 211. Thus, stored pressure in accumulator 320 may be selectively released to gear clutches 211 when electrically driven pump flow does not or cannot maintain a desired pressure downstream of line pressure solenoid valve 308. Since transmission fluid flow originates from sump 370 and proceeds to electrically driven pump 281 or mechanically driven pump 289 before reaching line pressure solenoid valve 308, line pressure solenoid valve 308 is downstream of electrically driven pump 281 and mechanically driven pump 289.

The system of FIGS. 1-3 provides for a vehicle system, comprising: an engine; a transmission coupled to the engine and including a torque converter having a torque converter clutch, an electric pump, a mechanical pump, and a clutch including a hydraulically operated clutch gap clutch gap filling device; a controller including executable instructions stored in a non-transitory memory for filling a gap of the clutch via extending the hydraulically operated clutch gap filling device in response to a request to improve vehicle drivability at expense of vehicle energy consumption, and to not extend the hydraulically operated clutch gap filling device in response to a request to improve vehicle energy consumption at expense of vehicle drivability, the hydraulically operated clutch gap filling device extended while the engine is stopped rotating.

In some examples, the system further comprises additional instructions for filling the gap with transmission fluid in response to a gear shift request. The vehicle system further comprises additional instructions for retracting the hydraulically operated clutch gap filling device in response to a gear being fully engaged. The vehicle system further comprises additional instructions for stopping rotation of the engine in response to a driver demand torque. The vehicle system further comprises additional instructions to shift the transmission to neutral in response to the driver demand torque. The vehicle system further comprises additional instructions to activate the electric pump in response to the driver demand torque.

Referring now to FIG. 4A, a cross section of a non-limiting example gear clutch 211 including a hydraulically operated gap filling device 499 is shown. Gear clutch 211 is shown with a hydraulically operated screw driven clutch gap filling device 499 in a retracted position where volume of gap or chamber 410 is larger than the volume of gap 410 shown in FIG. 4B.

The transmission may be operated with a high flow gear pump driven via the engine supplying transmission fluid throughout the transmission including delivering transmission fluid to close transmission clutches. The transmission clutches are provided with a gap 410 into which transmission fluid may flow to apply pressure to clutch pads 406 and clutch plates 408. A larger volume of gap 410 may ensure a more positive release of clutch 211. However, a larger volume of gap 410 may increase an amount of time it takes to close clutch 211 via fluid supplied via an electric pump. Consequently, shift times and noticeable driveline torque disturbances may increase if a transmission is shifted while transmission fluid is provide to transmission clutches via an electrically driven pump. Hydraulically operated screw driven clutch gap filling device 499 may be expanded and contracted in directions shown by arrow 440 to selectively increase or reduce the volume of gap 410. In particular, the volume of gap 410 may be increased when transmission fluid is circulated in the transmission via the mechanically driven pump. The volume of gap 410 may be reduced when transmission fluid is circulated in the transmission via the electrically driven pump to adjust for the lower flow rate of the electrically driven pump.

Gear clutch 211 includes a first shaft 402 for transmitting torque that may flow through gear clutch 211 to second shaft 404. However, in some examples, second shaft 404 may be omitted so that first shaft 402 may transmit torque flowing through gear clutch 211 to outer housing 414, which may interface with a shaft or other torque transfer device. First shaft rotates independent of outer housing 414 when clutch 211 is in an open state where torque is not transferred from first shaft 402 to second shaft 404. First shaft 402 is mechanically coupled or splined to clutch plates 408. Padded clutch plates 406, or clutch plates with pads, are mechanically coupled or splined to outer housing 414.

Gear clutch 211 includes a gap 410 between outer housing 414 and hydraulically operated clutch gap filler pressure plate face 420. Gear clutch 211 may be closed to engage a transmission gear via supplying pressurized transmission fluid to gap 410 so as to drive hydraulically operated clutch gap filler pressure plate face 420 toward first shaft 402. Hydraulic pressure provided via transmission fluid compresses clutch plates 408 and clutch plates with pads 406 together, thereby allowing torque transfer between first shaft 402 and second shaft 404. Transmission fluid is supplied to gap via clutch pressure control valve 310.

A volume of gap 410 may be increased or decreased via flowing transmission fluid to or from hydraulically operated gap filling device. Specifically, transmission fluid flowing from gap filler control solenoid 315 may cause screw 417 to rotate and adjust a position of hydraulically operated clutch gap filler pressure plate face 420. In some examples, screw 417 may be replaced with a piston or other displacement device. Spring 452 returns pressure plate face 420 when transmission fluid is released from clutch 211. By decreasing the volume of gap 410, clutch 211 may be filled sooner by an electrically driven pump so that clutches may shift via lower transmission fluid flow generating devices. On the other hand, the volume of gap 410 may be increased when the mechanically driven pump is activated to improve clutch release time (e.g., a time for an activated clutch to transition for transferring torque to not transferring torque). In this way, the volume of gap 410 may be adjusted depending on the device providing transmission fluid motive force.

Referring now to FIG. 4B, the clutch shown in FIG. 4A is shown in a position where hydraulically operated gap filling device 499 is in an extended position, which may be more suitable for activating clutch 211 via an electrically driven transmission pump. By extending the hydraulically operated clutch gap filler pressure plate face 420 the amount of time to engage or close clutch 211 via an electrically driven pump may be reduced. Further, the amount of transmission fluid used to close clutch 211 may be reduced so that a lower capacity pump may close clutch 211 in a timely manner.

Figure 5:
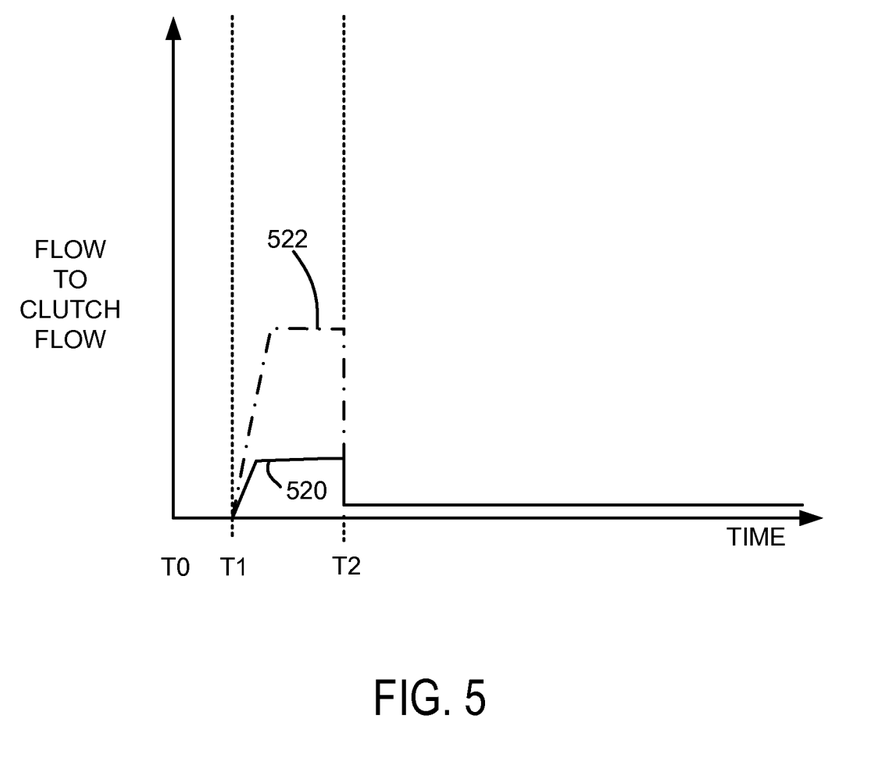
FIG. 5 shows an example clutch filling sequence and electrical pump speed during the clutch filling sequence.
Figure 6:
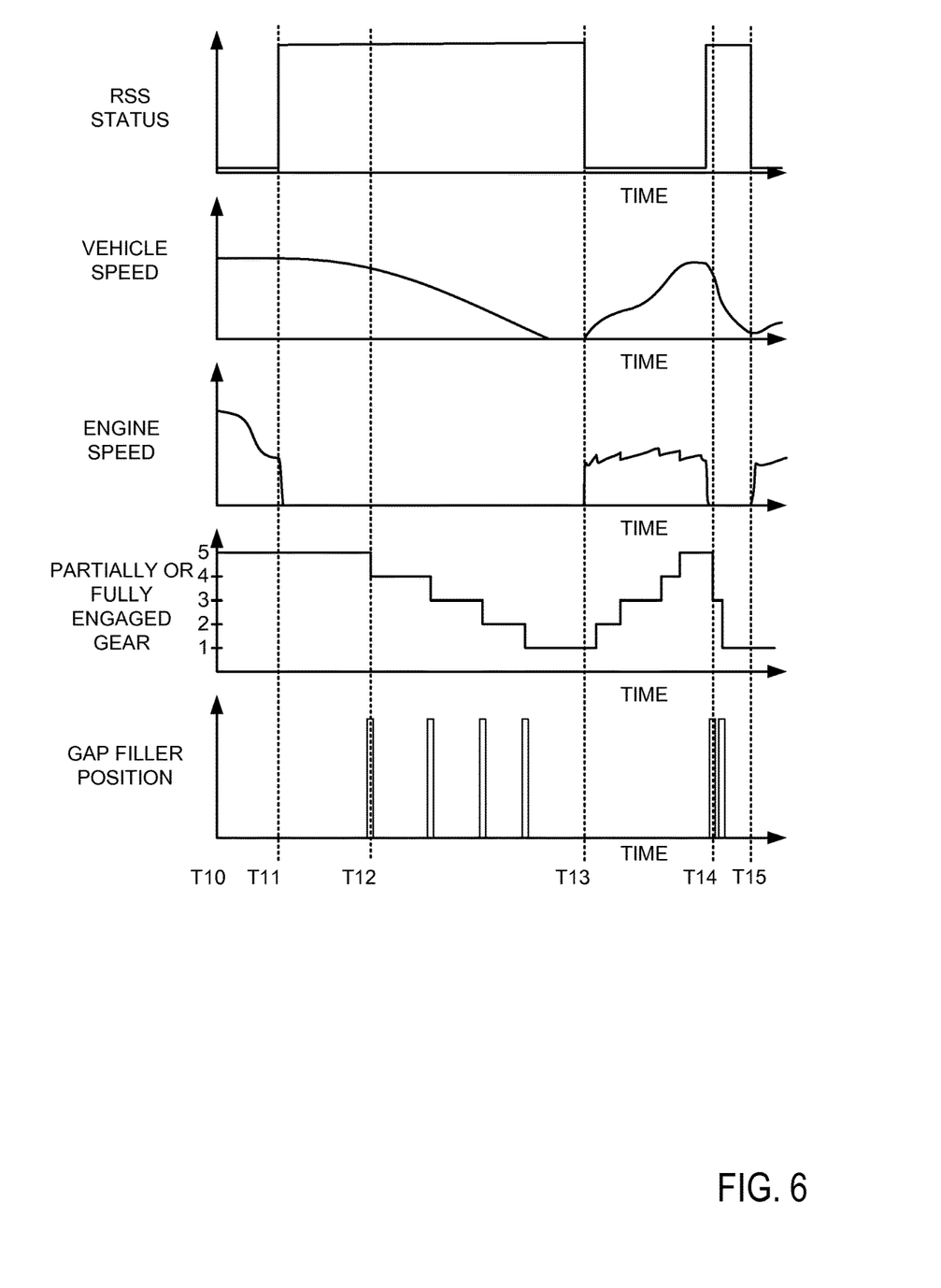
FIG. 6 shows an example driveline operating sequence according to the method of FIG. 7.

Referring now to FIG. 5, example prophetic clutch filling sequences for two different clutches is shown. The plot shows transmission fluid flow to a clutch versus time. The vertical axis represents transmission fluid flow to a clutch to close the clutch in a predetermined amount of time (e.g., time from T1 to T2). The horizontal axis represents time and time increases from the left side of the plot to the right side of the plot. The solid line 520 represents clutch filling for a clutch with a hydraulically operated clutch gap filler pressure plate face that is extended and filled via an electrically driven pump with a low flow rate. The dash-dot line 522 represents clutch filling for a clutch absent a hydraulically operated clutch gap filler pressure plate face and filled via a mechanically driven pump with a higher flow rate than the electrically driven pump.

At time T0, transmission fluid flow to the clutch is zero and the clutch pressure is zero. The clutch is not being activated or applied. In other words, the clutch is open and not transferring torque. The engine coupled to the transmission is not rotating (not shown) and the mechanical pump (not shown) within the torque converter is not rotating.

At time T1, the flow to the clutches is increased to close the clutches by time T2. Flow to the clutch without the hydraulically operated clutch gap filler pressure plate face 522 increases at a faster rate and achieves a higher peak flow rate. Flow to the clutch with the hydraulically operated clutch gap filler pressure plate face increases at a slower rate and it achieves a lower peak flow rate. In this way, operation of a clutch may be adjusted to maintain a desired clutch closing time even when a lower flow capacity transmission pump is supplying flow to the clutch.

At time T2, the clutches are fully closed and flow to the clutches is reduced to a level where a small amount of flow is provided to maintain the clutches in applied states. The clutches remain closed after time T2.

Referring now to FIG. 6, an example vehicle driveline operating sequence is shown. The signals and sequences of FIG. 6 may be provided by the system shown in FIGS. 1-3 executing the method of FIG. 7. Vertical markers T10-T15 represent times of interest in the sequence. In this example, two engine stopping events are shown. The first engine stopping event occurs between times T11 and T13. It represents an engine stopping event where the engine is not restarted until after the vehicle is stopped. The second engine stopping event occurs between times T14 and T15. It represents an engine stopping event where the engine is restarted before the vehicle comes to a stop.

The first plot from the top of FIG. 6 is a plot representing rolling start/stop (RSS) status versus time. The horizontal axis represents time and time increases from the left side of the plot to the right side of the plot. The vertical axis represents RSS status and RSS is active when the trace is at a higher level near the vertical axis arrow. RSS is not active when the trace is at a lower level near the horizontal axis. RSS may be activated to stop the engine and conserve fuel in response to a low driver demand torque or other conditions.

The second plot from the top of FIG. 6 represents vehicle speed versus time. The vertical axis represents vehicle speed and vehicle speed increases in the direction of the vertical axis arrow. Vehicle speed is zero at the horizontal axis. The horizontal axis represents time and time increases from the left side of the plot to the right side of the plot.

The third plot from the top of FIG. 6 represents engine speed versus time. The vertical axis represents engine speed and engine speed increases in the direction of the vertical axis arrow. The horizontal axis represents time and time increases from the left to the right side of the figure.

The fourth plot from the top of FIG. 6 represents an engaged or partially engaged transmission gear versus time. The vertical axis represents engaged or partially engaged transmission gear. The engaged or partially engaged transmission gear is indicated along the vertical axis. The horizontal axis represents time and time increases from the left to the right side of the figure. A partially engaged gear is a gear that is activated by a plurality of clutches and one of the plurality of clutch is not fully closed but the other clutches are fully closed.

The fifth plot from the top of FIG. 6 represents clutch gap filler positions versus time. The vertical axis represents hydraulically operated clutch gap filler positions and hydraulically operated clutch gap fillers are extended to reduce gap volume when the traces are near the vertical axis arrow. The horizontal axis represents time and time increases from the left to the right side of the figure.

At time T10, the RSS status is not asserted. Consequently, the engine is operating and rotating. The vehicle speed is at a higher level and the engine speed is at a higher level. The transmission is engaged in $5^{th}$ gear and the hydraulically operated clutch gap fillers are not extended since the transmission is supplied fluid via an engine driven mechanical pump.

At time T11, the RSS status transitions to active. Therefore, the engine is stopped rotating and the vehicle speed begins to decrease. The RSS mode may be activated in response to a driver releasing or partially releasing an accelerator pedal (not shown). One of a plurality of transmission clutches to engage $5^{th}$ gear is released so that $5^{th}$ gear is partially engaged. By releasing the one clutch, the transmission input shaft is decoupled from the transmission output shaft so that engine speed may be reduced to zero while the vehicle wheels continue to rotate. In other words, the transmission is in neutral with $5^{th}$ gear partially engaged. The transmission's electric pump is activated shortly thereafter to maintain transmission line pressure (not shown). The hydraulically operated clutch gap fillers are not extended.

Between time T11 and time T12, near time T12, the hydraulically operated clutch gap fillers are extended in one or more clutches to reduce the gap volume of one or more clutches. If the transmission shifts via only a single clutch, the hydraulically operated clutch gap filler of the single clutch is extended. If the transmission is downshifted to $4^{th}$ gear via a plurality of clutches, a plurality of hydraulically operated clutch gap fillers (e.g., a hydraulically operated clutch gap filler in each clutch used to activate $4^{th}$ gear) are extended to reduce gap volumes in each of the clutches.

At time T12, the transmission is downshifted from a partially engaged $5^{th}$ gear to a partially engaged $4^{th}$ gear. The transmission may be downshifted in response to a decrease in vehicle speed and transmission shifting following a shift schedule. The transmission shift schedule may be stored in memory and the table outputs a desired gear for a desired vehicle speed and driver demand torque. The RSS remains active. Therefore, the engine remains stopped. The transmission clutches to engage $4^{th}$ gear are filled via the electric pump. One of the transmission clutches may not be closed while the remaining clutches to engage $4^{th}$ gear are fully closed. In this way, it may be possible to partially engage a gear in preparation for an increase in driver demand torque.

Between time T12 and time T13, the transmission is downshifted several more times while RSS is active and the engine is stopped. The transmission gears are downshifted in response to the decreasing vehicle speed so that if the driver increases the driver demand torque, the transmission is in a gear suitable to transfer engine torque to the wheels without creating a driveline torque disturbance greater than a threshold torque. The transmission gears are partially engaged so that the transmission input shaft is not coupled to the transmission output shaft. One of the plurality of clutches to engage each of the illustrated gears is maintained in an open state so that the transmission does not transfer torque between the transmission input shaft and the transmission output shaft. Further, although not shown, if the transmission is shifted between two gears that have clutches that engage the respective gears in common, the hydraulically operated clutch gap fillers in those clutches may not be retracted between gear shifts. FIG. 6 shows the hydraulically operated clutch gap fillers being retracted after each new gear state is entered.

At time T13, the RSS status transitions to a lower level. The RSS status may transition to a lower level in response to a driver releasing a brake pedal or applying an accelerator pedal. The engine is started and the transmission's electric pump is stopped in response to engine speed exceeding a threshold speed where the mechanical pump supplies a desired flow rate of transmission fluid. Further, $1^{st}$ gear is fully engaged by closing a plurality of clutches that engage $1^{st}$ gear. The vehicle also begins to accelerate and the hydraulically operated clutch gap fillers are not extended to reduce gap volumes in the respective clutches.

Between time T13 and time T14, the transmission is upshifted through multiple transmission gears in response to increasing vehicle speed and driver demand torque (not shown). Near time T14 the driver demand torque decreases (not shown) and engine rotation is stopped. The hydraulically operated clutch gap fillers for $3^{rd}$ gear are extended based on the rate of change in vehicle speed.

At time T14, the RSS status transitions to a higher level. Consequently, the engine is stopped and the vehicle speed begins to decrease. The electric pump speed is activated in response to the RSS status. The transmission gears are partially engaged after time T14 during the downshifting to $1^{st}$ gear and hydraulically operated clutch gap fillers are extended and retracted in for each shift. The engine remains stopped.

At time T15, the engine is restarted before vehicle speed is zero and the RSS status transitions to a lower level. The engine is restarted in response to the RSS transitioning to a lower level. Shortly thereafter, the electric pump is deactivated and the hydraulically operated clutch gap fillers remain in retracted positions so as to increase volume in the respective clutch gaps.

In this way, hydraulically operated clutch gap fillers may be controlled to facilitate transmission gear shifting when an engine is stopped. Further, transmission gears may be shifted while the engine is stopped to improve driveline responsiveness and decrease the possibility of producing driveline torque disturbances.

Figure 7:
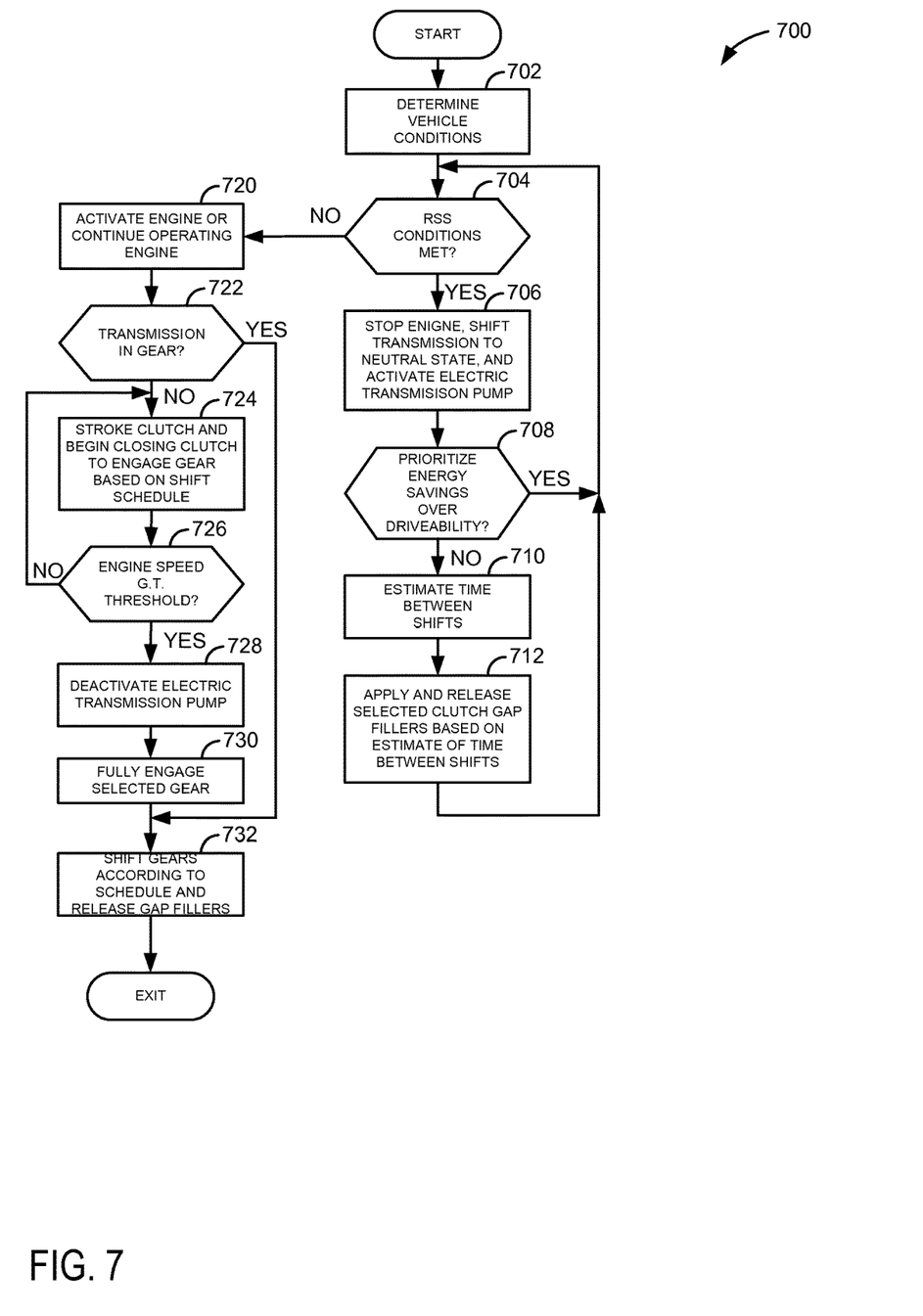
FIG. 7 shows a flowchart of an example method for operating the driveline with a transmission that includes clutch gap filling devices.

Referring now to FIG. 7, a method for operating a vehicle driveline is shown. The method of FIG. 7 may be incorporated into the system of FIGS. 1-3 as executable instructions stored in non-transitory memory. Further, the method of FIG. 7 may provide the operating sequence as is shown in FIGS. 5 and 6. Further still, portions of the method of FIG. 7 may be actions taken by controller 12 in the physical world to transform vehicle operating states via one or more actuators or sensors.

At 702, method 700 determines vehicle conditions. Vehicle conditions may include but are not limited to vehicle speed, engine speed, transmission accumulator pressure, driver demand torque, engaged or partially engaged transmission gear, and ambient environmental conditions. Method 700 proceeds to 704 after determining vehicle conditions.

At 704, method 700 judges whether or not rolling stop/start RSS conditions are met. RSS is a mode where an engine of the vehicle is stopped while the vehicle is rolling. However, in some examples, RSS may also include stopping the engine while the vehicle is stopped. RSS may be activated in response to a driver demand torque that is less than a threshold. In one example, driver demand torque may be determined from empirically determined values stored in a table or function. The table or function is indexed based on accelerator pedal position and vehicle speed. In other examples, RSS may be activated in response to other conditions such as a brake pedal being activated and a low driver demand torque. Thus, RSS may not be provided if the brake pedal is released. If method 700 judges that RSS conditions are met, the answer is yes and method 700 proceeds to 706. Otherwise, the answer is no and method 700 proceeds to 720.

At 706, method 700 stops engine rotation by stopping fuel flow and spark to the engine if the engine is not stopped. Further, method 700 shifts the transmission to neutral by opening one clutch of a plurality of clutches that engage the presently engaged transmission gear. The remaining clutches of the plurality of clutches that engage the presently engaged transmission gear remain closed so that the presently engaged gear is partially engaged or activated. For example, if $5^{th}$ gear is activated by closing $1^{st}$, $3^{rd}$, and $6^{th}$ clutches, the $3^{rd}$ clutch may be opened so that the transmission is in neutral and $5^{th}$ gear is partially engaged. Note that the number of clutches to activate a particular gear and the clutches that activate a particular gear may vary between different transmission types and are not intended to limit this specification. The transmission electric pump may also be activated by supplying electrical current to the electric pump. The transmission electric pump may not be activated if energy savings is prioritized over drivability at 708. If the transmission is already partially engaging a gear, the gear remains partially engaged.

At 708, method 700 judges whether or not to prioritize vehicle energy savings over vehicle drivability. In one example, vehicle energy savings may have higher priority that vehicle drivability in response to a driver requesting improve vehicle energy savings via a switch or human/machine interface. If method 700 judges to prioritize vehicle energy savings over vehicle drivability, the answer is yes and method 700 returns to 704. By returning to 704 the transmission is not downshifted and hydraulically operated gap filling devices are not extended to reduce volume in clutch gaps. If method 700 judges not to prioritize vehicle energy savings over vehicle drivability, the answer is no and method 700 proceeds to 710. Further, if method 700 returns to 704, transmission clutches are not operated when the engine is stopped. Consequently, the time to reactivate the engine and supply torque to vehicle wheels may increase, but less energy may be consumed by the vehicle.

At 710, method 700 estimates an amount of time between gear shifts. In one example, method 700 determines the vehicle deceleration rate by subtracting vehicle speed determined at a second time by vehicle speed determined at a first time and dividing the result by the difference between the second time and the first time. If the vehicle deceleration rate is less than a threshold, the transmission gears are sequentially downshifted one gear at a time (e.g., $5^{th}$ to $4^{th}$ to $3^{rd}$ to $2^{nd}$ to $1^{st}$). However, if the deceleration rate is greater than the threshold, the transmission gears may be skip shifted (e.g., $5^{th}$ gear to $3^{rd}$ gear to $1^{st}$ gear). In one example, gear changes occur according to a shift schedule that is based on vehicle speed and driver demand torque. Therefore, the amount of time between gear shifts may be estimated based on a speed that a gear is entered, a speed the gear is exited, and the vehicle deceleration rate. For example, if the vehicle is decelerating and $4^{th}$ gear is entered at 74 KPH and exited at 60 KPH while the vehicle is decelerating at 2 KPH, the time between gear shifts is (74−60)/2=7 seconds. The transmission electric pump speed may be adjusted in response to the time between shifts. Transmission electric pump speed may be increased by increasing current flow to the pump or decreased by decreasing current flow to the pump. For example, if the time between shifts is relatively short, the electric pump speed may be higher to decrease clutch filling time. If the time between shifts is relatively long, the electric pump speed may be lower to fill the clutch at a lower rate that reduces current supplied to the pump. Thus, if time between transmission gear shifts is increasing, electric pump speed may be decreased. If time between transmission gear shifts is decreasing, electric pump speed may be increased to reduce clutch filling time. Further, the transmission electric pump speed may be increased as accumulator pressure decreases to reduce clutch filling time. At higher accumulator pressures, the electric pump speed may be reduced. Method 700 proceeds to 714 after electric pump speed is adjusted.

At 714, method 700 maintains the transmission in neutral with a partially engaged gear. Further, method 600 shifts transmission gears to partially engage transmission gears based on a gear shift schedule, and hydraulically operated gap filling devices may be extended and/or retracted for each transmission gear shift. The gear that is partially engaged is based on vehicle speed and driver demand torque, which are used to index the gear shift schedule of predetermined gear values. Method 700 may engage and release a plurality of clutches via clutch pressure control valves while partially engaging selected gears. Likewise, method 700 may extend and/or retract hydraulically operated gap filling devices for each clutch that is applied or engaged and released. For example, method 700 may stroke clutch number one (e.g., supply fluid to clutch number one such that the torque transfer capacity of clutch number one is less than a threshold) and fully close clutches numbered two and five to partially engage $4^{th}$ gear while extending hydraulically operated gap filling devices for each of clutches numbered one, two, and five. The transmission may be downshifted from $4^{th}$ gear to partially engage $3^{rd}$ gear by opening clutch number five and closing clutch number three while clutch number two remains fully closed and clutch number one is stroked. The transmission remains in neutral during the shifting of gears to partially engage the scheduled gears. The hydraulically operated gap filling devices may be retracted after the shift is complete and the clutches are applied. Method 700 returns to 704 after shifting transmission gears.

At 720, activates the engine by engaging a starter and supplying spark and fuel to the engine if the engine is not already started. Method 700 proceeds to 722 after engine starting is initiated.

At 722, method 700 judges if the transmission is engaged in a gear. If so, the answer is yes and method 700 proceeds to 732. Otherwise, the answer is no and method 700 proceeds to 724.

At 724, method 700 engages a transmission gear. If a transmission gear is not partially engaged all transmission clutches to activate a particular gear based on the transmission gear shift schedule are closed by adjusting the clutch pressure control valves. If the transmission gear to be engaged is partially engaged, the stroked clutch is fully closed to engage the gear. The engaged gear is based on output of the transmission gear shift schedule. The accumulator flow control valve may be commanded open in response to a request to close one or more clutches. The accumulator flow control valve may be commanded closed in response to the one or more clutches being closed.

In addition, if the transmission electric pump is not activated, it may be activated at 724 to begin closing the clutches while engine speed is too low to provide a desired amount of flow through the mechanical transmission pump. Method 700 also adjusts the transmission electric pump speed in response to accumulator pressure. Method 700 proceeds to 726 after the clutches are commanded to engage the gear output from the shift schedule.

At 726, method 700 judges if engine speed is greater than a threshold speed. In one example, the threshold speed is a speed at which the mechanically driven transmission pump outputs a desired flow rate of transmission fluid. If method 700 judges that engine speed is not greater than the threshold speed, the answer is no and method 700 returns to 724. Otherwise, the answer is yes and method 700 proceeds to 728.

At 728, method 700 deactivates the transmission electric pump and retracts hydraulically operated gap filling devices. The electric pump is deactivated by ceasing current flow to the electric pump. The hydraulically operated gap filling devices may be retracted or released via controlling a valve. Method 700 proceeds to 730 after the transmission electric pump is deactivated.

At 730, method 700 fully engages the selected gear output from the transmission shift schedule via controlling flow to clutches as shown in FIG. 5. The clutches are supplied fluid via the clutch pressure control valves and the mechanically driven pump. Method 700 proceeds to 6732 after fully closing the clutches.

At 732, the transmission clutches are controlled via clutch pressure control valves and transmission gears are selected and engaged based on a transmission shift schedule. Method 700 proceeds to exit after clutches and gears are operated according to a transmission gear shift schedule.

In this way, the method of FIG. 7 provides for adjusting hydraulically operated gap filling devices to improve transmission shifting when an electrically driven transmission pump is activated while an engine is stopped. The hydraulically operated gap filling devices may be extended and retracted for each shift, or alternatively, they may be extended when the electric pump is activated and retracted when the electric pump is deactivated.

Thus, the method of FIG. 7 provides for a method for operating a vehicle driveline, comprising: activating an electrically driven transmission pump in response to a request to stop an engine; and adjusting a position of a hydraulically operated screw driven clutch gap filling device via fluid provided via the electrically driven transmission pump. The method includes where the hydraulically operated screw driven clutch gap filling device is within a transmission clutch. The method further comprises adjusting the position of the hydraulically operated screw driven clutch gap filling device in response to a request to shift a transmission when the engine is stopped rotating. The method includes where adjusting the position of the hydraulically operated screw driven clutch gap filling device includes reducing a volume of a hydraulic chamber in response to the request to shift the transmission.

In some examples, the method further comprises increasing a volume of the hydraulic chamber in response to a gear being fully engaged. The method includes where the engine is stopped rotating when the position of the hydraulically operated screw driven clutch gap filling device is adjusted. The method further comprises partially engaging a gear of a transmission by fully engaging one or more transmission clutches and adjusting the position of the hydraulically operated screw driven clutch gap filling device.

The method of FIG. 7 also provides for a method for operating a vehicle driveline, comprising: activating an electric transmission pump in response to a request to stop an engine; and reducing a volume of a clutch gap via adjusting a position of a hydraulically operated clutch gap filling device in response to an estimate of an amount of time between transmission gear shifts. The method includes where the amount of time is based on a vehicle deceleration rate and a gear shift schedule. The method further comprises increasing the volume of the clutch gap via adjusting the position of the hydraulically operated clutch gap filling device in response to a gear being fully engaged.

In some examples, the method further comprises starting the engine after stopping the engine and deactivating the electric transmission pump in response to engine speed exceeding a threshold speed a first time after a most recent engine start. The method includes where the engine is stopped when the volume of the clutch gap is reduced. The method further comprises partially activating a plurality of transmission gears by fully closing one or more clutches for each of the plurality of transmission gears and reducing the volume of the clutch gap via adjusting the position of the hydraulically operated clutch gap filling device. The method further comprises increasing a volume of the clutch gap via filling the clutch gap with transmission fluid.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a vehicle driveline, comprising:
   activating an electrically driven transmission pump in response to a request to stop an engine; and
   adjusting a position of a hydraulically operated screw driven clutch gap filling device via fluid provided via the electrically driven transmission pump.

2. The method of claim 1, where the hydraulically operated screw driven clutch gap filling device is within a transmission clutch.

3. The method of claim 1, further comprising adjusting the position of the hydraulically operated screw driven clutch gap filling device in response to a request to shift a transmission when the engine is stopped rotating.

4. The method of claim 3, where adjusting the position of the hydraulically operated screw driven clutch gap filling device includes reducing a volume of a hydraulic chamber in response to the request to shift the transmission.

5. The method of claim 4, further comprising increasing a volume of the hydraulic chamber in response to a gear being fully engaged.

6. The method of claim 1, where the engine is stopped rotating when the position of the hydraulically operated screw driven clutch gap filling device is adjusted.

7. The method of claim 1, further comprising partially engaging a gear of a transmission by fully engaging one or more transmission clutches and adjusting the position of the hydraulically operated screw driven clutch gap filling device.

8. A method for operating a vehicle driveline, comprising:
   activating an electric transmission pump in response to a request to stop an engine; and
   reducing a volume of a clutch gap via adjusting a position of a hydraulically operated screw driven clutch gap filling device located within a clutch in response to an estimate of an amount of time between transmission gear shifts.

9. The method of claim 8, where the amount of time is based on a vehicle deceleration rate and a gear shift schedule.

10. The method of claim 8, further comprising increasing the volume of the clutch gap via adjusting the position of the hydraulically operated screw driven clutch gap filling device in response to a gear being fully engaged.

11. The method of claim 10, further comprising starting the engine after stopping the engine and deactivating the electric transmission pump in response to engine speed exceeding a threshold speed a first time after a most recent engine start.

12. The method of claim 8, where the engine is stopped when the volume of the clutch gap is reduced.

13. The method of claim 8, further comprising partially activating a plurality of transmission gears by fully closing one or more clutches for each of the plurality of transmission gears and reducing the volume of the clutch gap via adjusting the position of the hydraulically operated screw driven clutch gap filling device.

14. The method of claim 8, further comprising increasing the volume of the clutch gap via filling the clutch gap with transmission fluid.

15. A vehicle system, comprising:
an engine;
a transmission coupled to the engine and including a torque converter having a torque converter clutch, an electric pump, a mechanical pump, and a clutch including a hydraulically operated screw driven clutch gap filling device;
a controller including executable instructions stored in a non-transitory memory for filling a gap of the clutch via extending the hydraulically operated screw driven clutch gap filling device in response to a request to prioritize vehicle drivability over vehicle energy consumption, and to not extend the hydraulically operated screw driven clutch gap filling device in response to a request to not prioritize vehicle drivability over vehicle energy consumption, the hydraulically operated screw driven clutch gap filling device extended while the engine is stopped rotating.

16. The vehicle system of claim 15, further comprising additional instructions for filling the gap with transmission fluid in response to a gear shift request.

17. The vehicle system of claim 15, further comprising additional instructions for retracting the hydraulically operated screw driven clutch gap filling device in response to a gear being fully engaged.

18. The vehicle system of claim 15, further comprising additional instructions for stopping rotation of the engine in response to a driver demand torque.

19. The vehicle system of claim 18, further comprising additional instructions to shift the transmission to neutral in response to the driver demand torque.

20. The vehicle system of claim 19, further comprising additional instructions to activate the electric pump in response to the driver demand torque.

* * * * *